(12) United States Patent
Ding (10) Patent No.: US 12,242,352 B2
(45) Date of Patent: Mar. 4, 2025

(54) REPLICATION MANAGEMENT SYSTEM (71) Applicant: SAP SE, Walldorf (DE)

(72) Inventor: Xuemin Ding, Shanghai (CN)

(73) Assignee: SAP SE, Walldorf (DE)

( * ) Notice: Subject to any disclaimer, the term of this patent is extended or adjusted under 35 U.S.C. 154(b) by 458 days.

(21) Appl. No.: 17/508,041

(22) Filed: Oct. 22, 2021

(65) Prior Publication Data
US 2023/0129469 A1    Apr. 27, 2023

(51) Int. Cl.
*G06F 11/14* (2006.01)

(52) U.S. Cl.
CPC ............... *G06F 11/1448* (2013.01)

(58) Field of Classification Search
CPC ............ G06F 11/1448; G06F 11/1451
See application file for complete search history.

(56) References Cited

U.S. PATENT DOCUMENTS

| | | | |
|---|---|---|---|
| 5,819,268 A | 10/1998 | Hackett | |
| 6,834,279 B1 | 12/2004 | Chiang | |
| 7,080,072 B1 | 7/2006 | Sinclair | |
| 10,437,853 B2 | 10/2019 | Bantupalli et al. | |
| 10,698,892 B2 | 6/2020 | Sung et al. | |
| 11,341,234 B1* | 5/2022 | Voss | G06F 11/1451 |
| 11,343,142 B1* | 5/2022 | Wang | G06F 16/254 |
| 2019/0286841 A1 | 9/2019 | Staub et al. | |
| 2020/0311254 A1* | 10/2020 | Mondello | G06F 21/52 |
| 2020/0403797 A1 | 12/2020 | Certain et al. | |
| 2021/0255931 A1* | 8/2021 | Badola | G06F 11/1448 |
| 2021/0382795 A1* | 12/2021 | Singhal | G06F 11/1451 |
| 2023/0066989 A1* | 3/2023 | Iskender | G06F 16/213 |

OTHER PUBLICATIONS

Verbeeck, K., "Using hash values in SSIS to determine when to insert or update rows," printed from https://www.mssqltips.com/sqlservertip/3170/using-hash-values-in-ssis-to-determine-when-to-insert-or-update-rows/, 12 pages (Oct. 15, 2019).
Xiong, J., "T-SQL—Compare Records Using Hash Values," printed from https://www.johnxiong.com/2018/01/04/t-sql-compare-records-using-hash-values/, 7 pages (Mar. 10, 2018).

* cited by examiner

Primary Examiner — Pierre M Vital
Assistant Examiner — Jedidiah P Ferrer
(74) Attorney, Agent, or Firm — Sterne, Kessler, Goldstein & Fox P.L.L.C.

(57) ABSTRACT

Disclosed herein are various embodiments a replication management system. An embodiment operates by identifying that code of a replication program includes an update. A source table is selected and corresponding expected table is determined, the expected table including data from the source table as it would appear at the new location as a result of a successful replication process. The code of the replication program including the update is executed against the data of the source table to generate a runtime table. A hash of the expected table is compared to a hash of the runtime table to determine whether the replication process using the code of the replication program including the update was successful. A report including the determination is provided.

20 Claims, 4 Drawing Sheets

REPLICATION MANAGEMENT SYSTEM

BACKGROUND

A replication system may transfer, replicate, or copy data from a first location to a second location for a various reasons. However, regardless of the reason for replication, the actual code that is executed to perform the actual data replication process must be reliable to ensure the data is accurately copied or replicated and for the replication to be successful. A failed replication resulting in producing inaccurate data at the second location could both be difficult to trace and create problems for any systems and persons relying on the replicated data. As such, testing this replication code before it goes live, to ensure the code is properly copying or replicating data after the code updates is important, but this testing also often a time consuming and resource intensive process.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

A replication system may transfer, replicate, or copy data from a first location to a second location for a various reasons. However, regardless of the reason for replication, the actual code that is executed to perform the actual data replication process must be reliable to ensure the data is accurately copied or replicated and for the replication to be successful. A failed replication resulting in producing inaccurate data at the second location could both be difficult to trace and create problems for any systems and persons relying on the replicated data. As such, testing this replication code before it goes live, to ensure the code is properly copying or replicating data after the code updates is important, but this testing also often a time consuming and resource intensive process.

Figure 1:
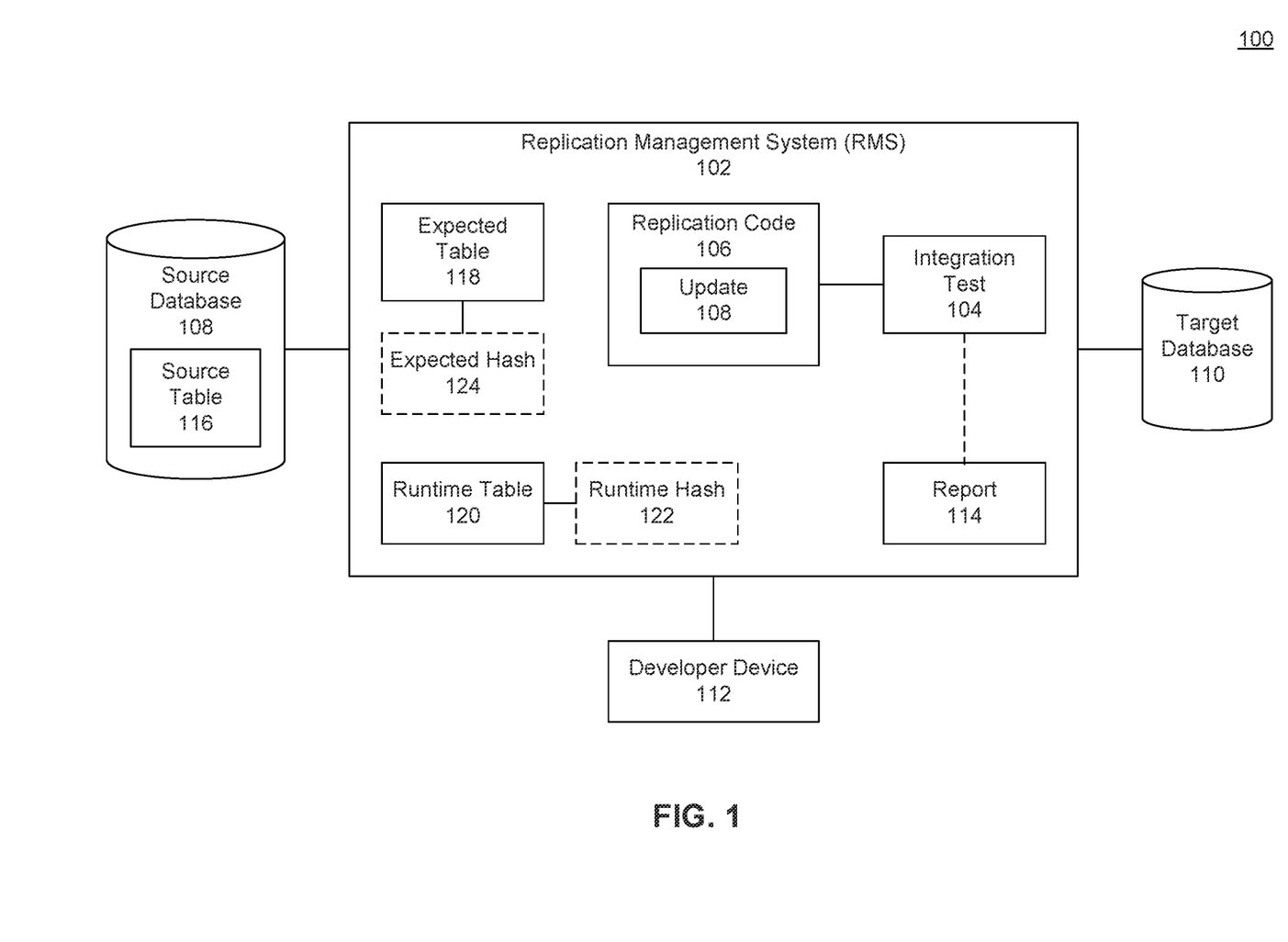
FIG. 1 is a block diagram illustrating functionality for a replication management system (RMS), according to some example embodiments.

FIG. 1 is a block diagram 100 illustrating functionality for a replication management system (RMS) 102, according to some example embodiments. RMS 102 may enable for a real-time integration test 104 to be performed on replication code 106 that includes one or more updates 108.

In some embodiments, RMS 102 may facilitate the replication of data from a source database 108 to a target database 110. Source database 108 and target database 110 may be any type of storage system or databases, including in-memory, column-store, or relational, row-oriented databases.

In some embodiments, replication code 106 may be the program, application, or computing code that is executed to perform the actual replication (e.g., data movement, copying, transformation, addition, deletion) process. Though illustrated as only be stored on or executed by RMS 102, in other embodiments, replication code 106 may also or alternatively be stored and/or executed on source database 108 and/or target database 110, or other intermediary computing devices as part of the replication process. Replication code 106 may include any code that is used to perform the various applications of a replication process, including copying, moving, cutting, deleting, adding and modifying data or data files, and may include modifying database or table schemas. In some embodiments, replication code 106 may include data transformations that add, delete, and/or change data values, rows, or columns during the replication process.

In some embodiments, replication code 106 may occasionally, periodically, or routinely be updated with one or more updates 108. Update 108 may include any modification to the replication code 106, and may include adding, deleting, or modifying existing replication code 106 made by one or more developers.

In some embodiments, replication code 106 and/or update 108 may be stored in a separate repository, which may offer version control. The version control system may update the version of the replication code 106 each time an update 108 is completed, submitted, and/or compiled. The version control system may track which version(s) of the replication code 108 with their various updates 108 have been tested and/or are awaiting testing. In some embodiments, a developer using a developer device 112 may perform or submit update 108 and request or execute a push validation on the update 108 when it is complete. The version control system may then store the replication code 106 with the new update 108 as a new version awaiting testing.

In some embodiments, a push validation command or a request to compile the replication code 106 with the update 108 may signal RMS 102 to execute an integration test 104. In other embodiments, RMS 102 may periodically (e.g., every hour) check for any new versions or updates 108 that have been submitted and that may require an integration test 104 before being made live. In some embodiments, if multiple updates 108 have been submitted, then all the updates may be tested together. In other embodiments, each update 108 may be assigned its own code version and tested separately. In some embodiments, the replication code 106 with an untested update 108 may be stored or maintained as a temporary version in the code repository, with its own temporary version number indicating it is untested, until an integration test 104 is executed and the code is validated. At which point, if the code passed the test, a new tested version number may be assigned to the code.

In some embodiments, integration test 104 may be a test that validates whether the updated code (e.g., replication code 106 with update 108) is executing properly or as expected (e.g., creating the expected, correct replication result). The integration test 104 may include multiple tests to ensure the replication code 106 with the update 108 meets any compliance and/or functional requirements of the replication process. It is important that the updated code is validated with an integration test 104 before it is made live and used in an actual replication process to prevent any errors or faulty replications. Any errors that occur during a live replication due to faulty code may be very difficult to identify, trace, and correct. Correcting errors in faulty replication code can be both extremely time consuming and resource intensive.

In some embodiments, the replication process may perform initial load replication and/or delta load replication. As an example, initial load may include copying the entire table from a source to a target. In some embodiments, initial load may include a filter to select a subset of the columns to copy. Delta load may include performing periodic or real-time replication, in which the data will continuously or periodically replicated from source to target, if there is some new changes in source, then the changes will be captured and replicated to target.

As part of the replication process, RMS 102 may use data definition language (DDL) and/or data manipulation language (DML) to prepare a source table 116 for an integration test 104. In some embodiments, data filters may be used to only replicate data of source table 116 that satisfies the filters. In some embodiments, transform operations may be used to add new columns or rename columns in a target or runtime table 120.

A general integration test usually requires a system to perform a row-by-row and column-by-column comparison of all the data copied from a first location to a second location to validate a replication. However, this process is extremely resource intensive and time consuming, and often slows down the system and reduces the available network bandwidth for other processes, thus creating delays. As a result, this general integration test is run infrequently and only during what are considered off times or less busy times, because of the amount of computing resources and bandwidth a general integration test will consume.

There are multiple problems with using a general integration test in that not only does the system slow down for any users who happen to need the system while the general integration test is operating, but also, any code updates must wait until the general integration test is performed to be implemented. However, due to the infrequency with which the general integration test can be executed without incurring significant system delays, it may be days before code updates can be tested. Not only does this delay identifying and fixing any bugs or errors resulting from the general integration test, but also it forces a replication system to continue using old, outdated, potentially slower and/or error-prone replication code that the updates were intended to fix.

RMS 102 addresses these and other drawbacks of a general integration test, with integration test 104, as described herein. As part of integration test 104, by reducing the amount of resources required to perform integration test 104 relative to a general integration test, RMS 102 may be able to test code updates 108 periodically or in real-time. This may shorten the program development lifecycle, make identifying bugs faster and easier through the use of reports 114, and provide for more efficient replication using the test updates to the replication code. Further, the saved resources in performing integration test 104 may then be used to perform other functionality, including running multiple integration tests 104 concurrently on different code updates 108. In some embodiments, RMS 102 may create a new thread for each replication task or integration test 104, which may enable multiple tasks or integration tests 104 to be executed in parallel.

In some embodiments, RMS 102 may provide a developer fast, detailed feedback as to what tests were run, passed, and failed, and what specifically caused the failure (if any) in a report 114. Report 114 may indicate what tests and/or replication tasks passed and/or failed and may be used to by a developer to quickly identify and fix any errors to update 108. All of this may be done in real-time and thus may speed up the code development lifecycle and improve the quality/speed of the replication processes being executed by a system such as RMS 102.

In some embodiments, RMS 102 may identify a source table 116 and a corresponding expected table 118. In some embodiments, source table 116 may include a view and may include selection of data from one or more tables of source database 108 or another known source that can be used to test whether replication code 106 and update 108 are executing properly or as expected. The source view may then be replicated to a target table. Expected table 118 may include a corresponding version of the source table 116 with the data as it should appear after the replication process (which may include one or more data and/or schema transformations) has successfully completed.

In some embodiments, source table 116 and expected table 118 may have been previously selected or identified and may be verified as being accurate. For the purposes of performing the integration test 104, the update 108 may not change the actual data or schema transformations being performed during the replication process (thus not changing the expected table 118 results), but instead may be code updates or improvements to how the replication process itself is utilizing resources and performing the data transformations and replication activities.

When RMS 102 detects that an update 108 needs to be tested, RMS 102 may execute the replication code 106 including the update 108 against the source table 116 as part of integration test 104, which may generate a runtime table 120. Runtime table 120 may include the actual data output resulting from executing replication code 106 including update 108 against the data of source table 116.

In some embodiments, RMS 102 may include a runtime source table that is a duplicate of source table 116, and runtime target table 120 that is generated by RMS 102 in target database 110 from the runtime source table. For example, RMS 102 may create or test the replication code 106 and update 108 on a copy of duplicate of source table 116. The duplicate may then be used to test replications, in case of accidental changes to source table 116 by the update 108 or delta replication tests which may modify source table 116. Updating or changing the duplicate table avoids corrupting the original source table 116, which may be set to read-only.

Rather than performing a row-by-row and column-by-column comparison to validate whether each data value of runtime table 120 matches the each corresponding data value in expected table 118 as may be performed by a general integration test, which is a resource intensive process that will slow down the system, RMS 102 may use hash values to perform a comparison in executing integration test 104.

For example, RMS 102 may generate a hash table, runtime hash 122, for runtime table 120. Runtime hash 122 may include a hash value of one or more (or all) of the rows of runtime table 120. RMS 102 may also generate or receive expected hash 124 which may be or include a hash value of one or more (or all) of the rows of the corresponding expected table 118. However, because expected table 118 may already be known prior to update 108, the hash values of expected hash 124 may already be pre-generated and may not need to be generated again, thus saving valuable computing resources, particularly when multiple integration tests 104 are performed—all of which may use the same expected hash 124.

In performing an integration test 104 for an initial load, in initial mode, data from source table 116 may be replicated to target database 110 only one time, and RMS 102 may use the runtime hash 122 to do a single comparison. By contrast, in delta mode (for delta load or replications) RMS 102 may operate in several stages. For example, in stage one, new data may be added to source table 116, RMS 102 will capture these data changes and replicate to target, Then, for example, RMS 102 may wait for some time to compare the expected stage hash table with runtime target hash table via integration test 104. RMS 102 may then repeat this for all the stages in which new data is added or data is removed/modified. Each stage may have a hash comparison between runtime target hash table and expected stage hash table.

Further, in some embodiments, certain values of source table 116 may need to be updated or changed to generate the hash table and/or otherwise perform integration test 104. For example, if any values are NULL in source table 116, they may be changed to a predetermined or known value which may be used to replace the NULL value for the purposes of generating the runtime hash 122. Or, for example, datetime values may be changed to a different type, such as char before or as part of integration test 104. Rather than changing the original source table 116, a duplicate or runtime source table may be used.

As part of integration test 104, RMS 102 may compare the hash values of expected hash 124 to the corresponding hash values of runtime hash 122 to determine whether the data of source table 116 was properly or successfully replicated by replication code 106 with update 108. Comparing a small set of hash values consumes far fewer resources than doing a row-by-row and column-by-column comparison of all the values across multiple tables. The results of the comparison of the hash values, in executing integration test 104, may be used to generate report 114. In some embodiments, at the end of the integration test 10, the expected hash table 124, runtime hash 122, and runtime table 120 may be automatically deleted or garbage collected by RMS 102 without user intervention.

Report 114 may include an indication of what tests were executed as part of integration test 104, the results of the tests (pass/fail), and for any failed tests, the report 114 may also include an indication of what rows were improperly replicated and may even include a list of the expected and runtime data values.

As noted above, in some embodiments, each hash value (of expected hash 124 and runtime hash 122) may correspond to a row of source table 116. This may enable RMS 102 to identify for which row(s) the hash values did and did not match. For any mismatched hash values, RMS 102 may retrieve the corresponding data values from both expected table 118 and runtime table 120 and include those in report 114.

In some embodiments, if RMS 102 detects a difference in the hash values, RMS 102 may locate the primary key and the real row data on both expected table 118 and runtime table 120 and include the variances as part of a report 114, which may be used to further modify or debug the update 108.

As just noted, in some embodiments, report 114 may be provided to a developer device 112 (e.g., via email, text, or other electronic notification) and viewed by a developer who may then fix any errors noted in report 114. In some embodiments, if there are no errors with update 108, then developer may be provided the option of making the update 108 live in a new or tested version of replication code 106. In other embodiments, RMS 102 may automatically make the update 108 live if there are no errors during integration test 104. In some embodiments, RMS 102 may then perform a replication process using replication code 106 and tested update 108 to replicate data from source database 108 to target database 110.

Figure 2:
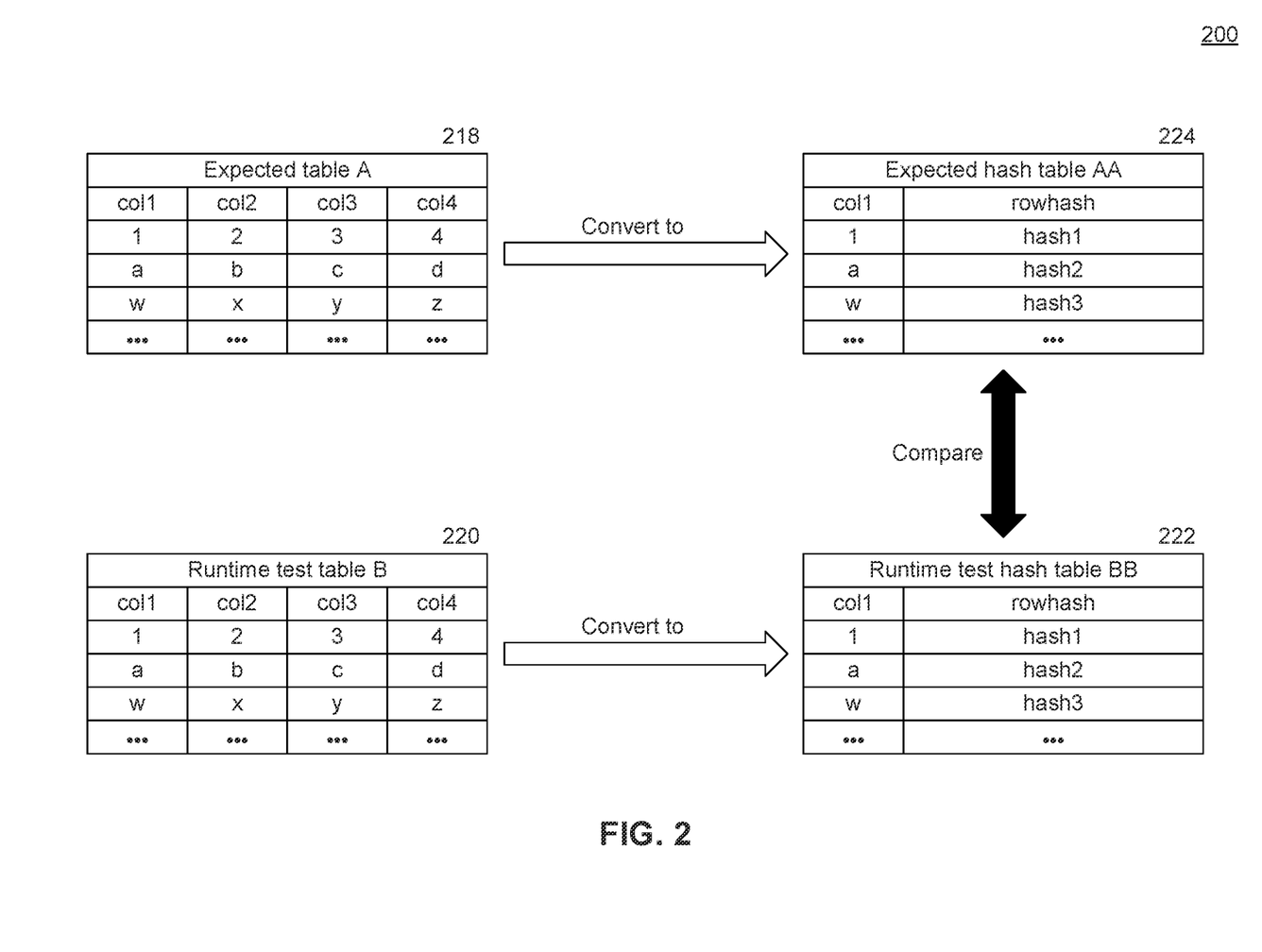
FIG. 2 is a block diagram illustrating functionality for a replication management system (RMS), according to some additional example embodiments.

FIG. 2 is a block diagram 200 illustrating functionality for a replication management system (RMS), according to some additional example embodiments. As illustrated in FIG. 2, expected table 218 and its corresponding expected hash table 214 may be known prior to receiving an integration test request or request to test a code update 108. In some embodiments, expected table 218 and expected hash table 214 may be stored in a known location that may be accessed by RMS 102 when performing integration test 104.

In some embodiments, RMS 102 may generate a runtime table 220 and convert it to or generate its corresponding runtime hash 222. As noted above, RMS 102 may then compare the runtime hash 222 to the expected hash 224 to determine whether the replication process was successful. In the example illustrated, the hash values may match and this may be indicated in report 114.

However, if the first value in col 1 of runtime table 220 was 0 instead of 1, this may indicate a failed integration test 104. Then, for example, report 114 may indicate which test(s) failed, and provide in report the expected values of row 1 (1, 2, 3, 4) of expected table 218 and the runtime or actual values of row 1 (0, 2, 3, 4).

Figure 3:
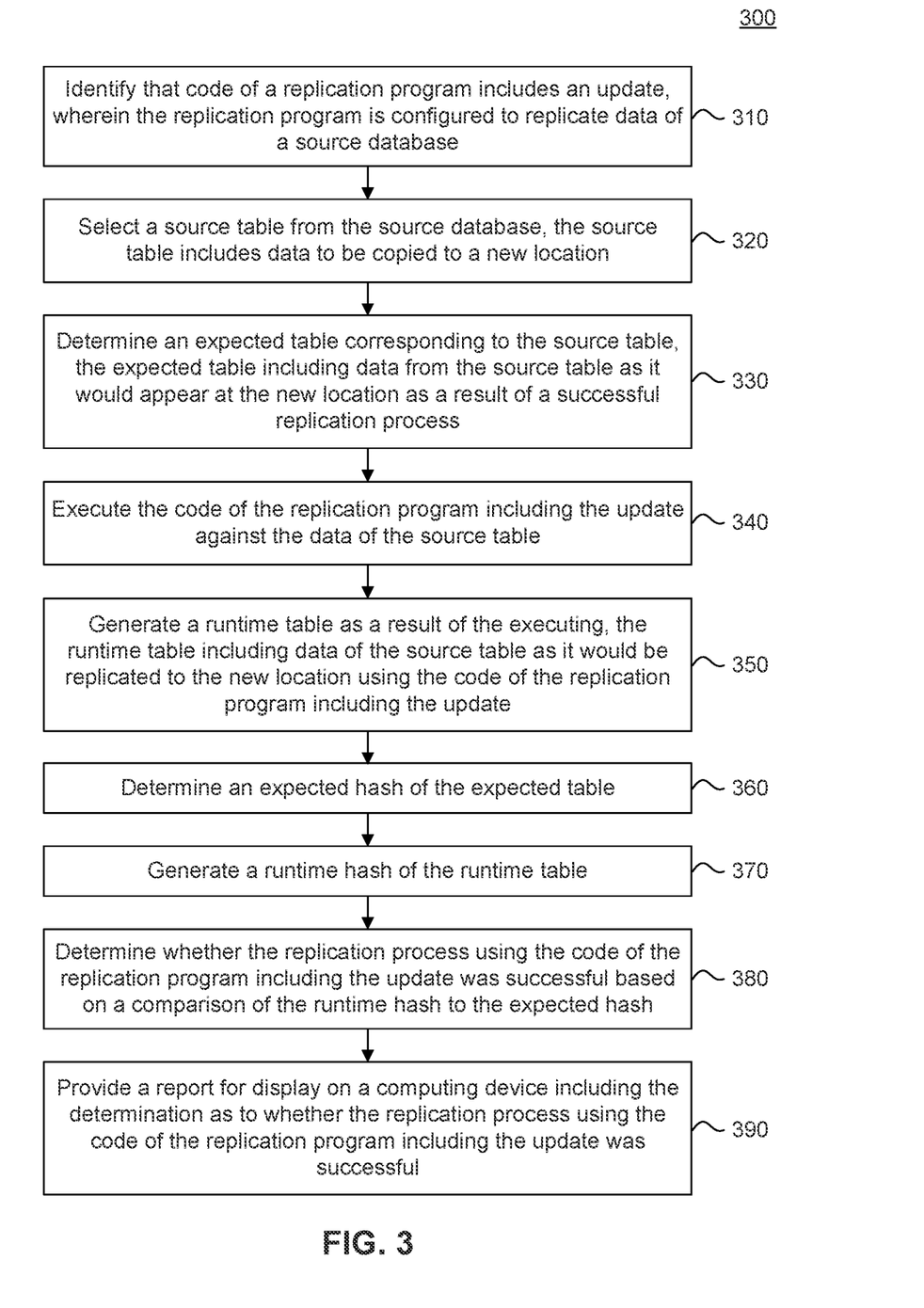
FIG. 3 is a flowchart illustrating example operations for functionality for a replication management system (RMS), according to some embodiments.

FIG. 3 is a flowchart illustrating example operations for functionality for a replication management system (RMS), according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to the figures.

At 310, code of a replication program that includes an update is identified, wherein the replication program is configured to replicate data of a source database. For example, RMS 102 may identify that update 108 (or multiple updates 108) have been added to a code repository including replication code 106. The replication code 106 may be configured to cause one or more computing devices to replicate data from source database 108 to target database 110.

At 320, a source table is selected from the source database, the source table includes data to be copied to a new location. For example, RMS 102 may receive or select a source table 116. In some embodiments, source table 116 (or source view) may include a selection of data from one or more tables of source database that is used to test replication code 106 with one or more updates 108. In some embodiments, source table 116 may include multiple tables. In some embodiments, source table 116 may include data that is not stored or retrieved from source database 108, but instead is retrieved from one or more different sources (not illustrated).

At 330, an expected table corresponding to the source table is determined, the expected table including data from the source table as it would appear at the new location as a result of a successful replication process. For example, expected table 118 may include data of source table 116, as it should appear on a target device or location after a successful replication process has been executed. In some embodiments, the replication process may include data transformations, adding data, removing data, and/or schema changes (e.g., changes in columns and/or stored data values), and all of these changes may be included across one or more expected tables 118.

At 340, the code of the replication program including the update is executed against the data of the source table. For example, as part of performing integration test 104, RMS 102 may execute replication code 106 including update 108 against source table 116.

At 350, a runtime table is generated as a result of the executing, the runtime table including data of the source table as it would be replicated to the new location using the code of the replication program including the update. For example, RMS 102 may generate runtime table 120 as a result of executing replication code 106 including update 108 against source table 116.

At 360, an expected hash of the expected table is determined. For example, RMS 102 may retrieve or generate expected hash 124 for expected table 118. In some embodiments, expected hash 124 may include hash values across the various rows of expected table 118 (or tables if there are multiple expected tables 118 to be generated).

At 370, a runtime hash of the runtime table is generated. For example, RMS 102 may use the same hashing algorithm to generate runtime hash 122 for the various rows of runtime table 120 (or runtime tables if multiple tables are generated).

At 380, it is determined whether the replication process using the code of the replication program including the update was successful based on a comparison of the runtime hash to the expected hash. For example, as part of integration test 104, RMS 102 may execute tests and/or may compare the expected hash 124 values to the runtime hash 122 values to determine if the replication process using the replication code 106 with the update 108 was successful.

At 390, a report is provided for display on a computing device including the determination as to whether the replication process using the code of the replication program including the update was successful. For example, RMS 102 may generate a report 114 if the integration test 104 failed, and may indicate what table(s) and/or row(s) failed to be properly replicated with the inclusion of update 108 with replication code 106. In some embodiments, RMS 102 may automatically push live (in a new code version) the replication code 106 with update 108 if the integration test 104 was successful. In some embodiments, RMS 102 may automatically then perform the next replication of data from source database 108 to target database 110 using the newly updated and tested version of the replication code 106 including update 108.

Figure 4:
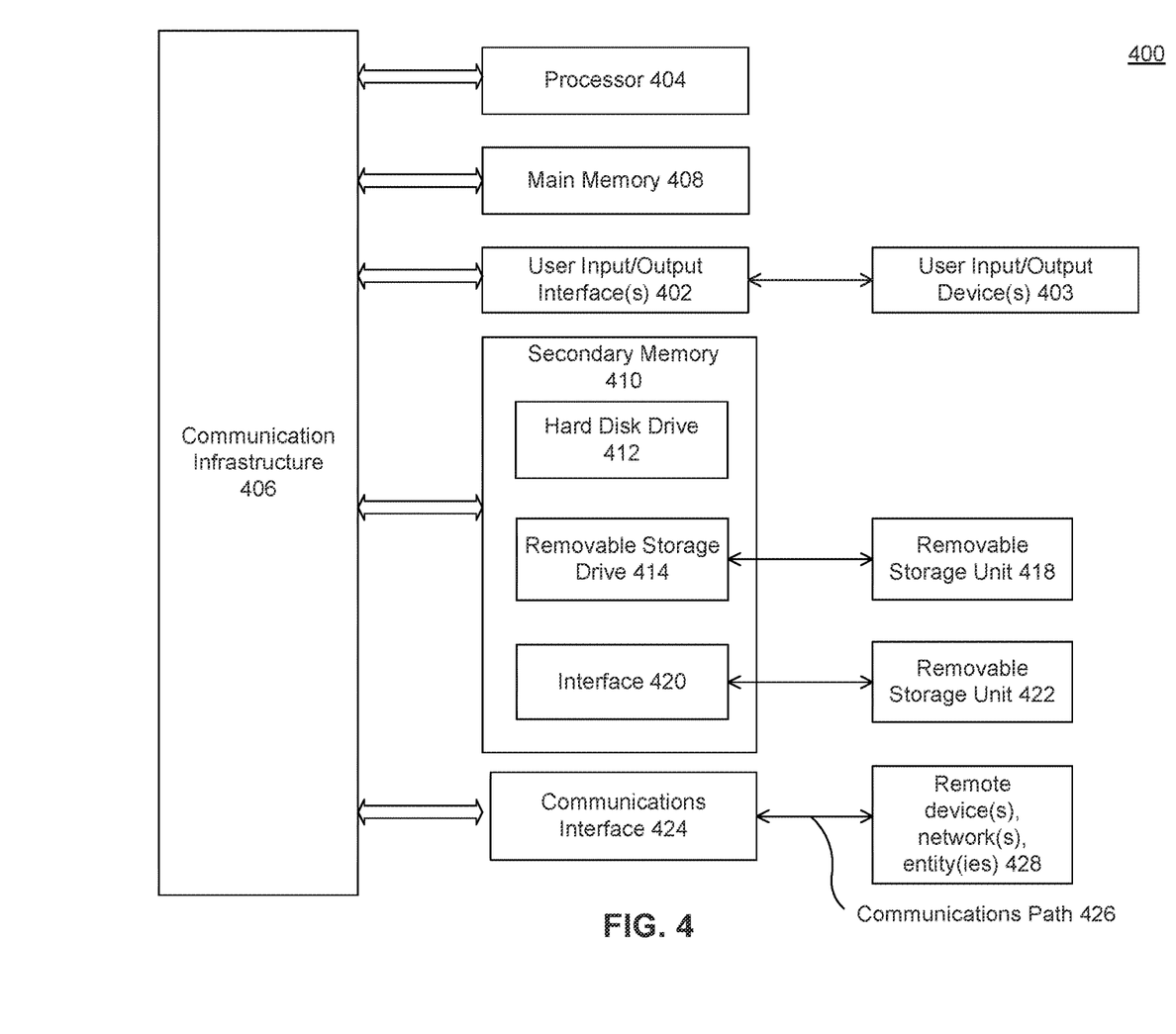
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface (s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random-access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" and/or cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "some embodiments" "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:

identifying that code of a replication program includes an update, wherein the replication program is configured to perform one or more data transformations or schema transformations in replicating data of a source database to a target database, wherein replicated data at the target database is different from the data of the source database;

performing an integration test on the code and the update of the replication program, before the replication program is used in an actual replication process, wherein the performing comprises:

selecting a source table from the source database, the source table including data to be copied to a new location;

determining an expected table corresponding to the source table for the integration test, the expected table including data from the source table as it would appear at the new location as a result of a successful replication process, including the one or more data transformations or schema transformations, in executing the replication program comprising the code and the update;

executing the code of the replication program including the update against the data of the source table;

generating a runtime table as a result of the executing, the runtime table including data of the source table as it would be replicated to the new location using the code of the replication program including the update, wherein the runtime table includes data from the source table including the one or more data transformations or schema transformations;

determining an expected hash of the expected table;

generating a runtime hash of the runtime table;

determining a result of the integration test and whether the replication process using the code of the replication program including the update was successful based on a comparison of the runtime hash to the expected hash; and providing a report for display on a computing device including the determination as to successful, wherein upon determining a successful result of the integration test as indicated by the report, the replication program including the update is made available for the actual replication process.

2. The method of claim 1, wherein the generating the runtime hash of the runtime table comprises:
generating a plurality of hash values for the runtime table, wherein each of the plurality of hash values for the runtime table corresponds to a different row of the runtime table.

3. The method of claim 2, wherein the determining the expected hash of the expected table comprises:
determining that each of a plurality of hash values for the expected table corresponds to a different row of the expected table.

4. The method of claim 3, wherein the comparison comprises:
comparing at least a subset of the plurality of hash values for the runtime table to corresponding hash values for corresponding rows of the expected table.

5. The method of claim 4, wherein the comparing comprises:
determining that a first hash value for the runtime table does not match a corresponding second hash value for the expected table;
identifying a row corresponding to the first hash value; and
providing the identified row in the report for display on the computing device.

6. The method of claim 5, further comprising:
identifying a first set of values corresponding to the identified row of the runtime table;
identifying a second set of values corresponding to the identified row of the expected table; and
providing the first set of values and the second set of values in the report for display on the computing device.

7. The method of claim 1, wherein the source table is selected and the expected table is determined prior to the identifying that code of the replication program includes an update.

8. A system, comprising:
a memory; and
at least one processor coupled to the memory and configured to perform instructions that cause the at least one processor to perform operations comprising:
identifying that code of a replication program includes an update, wherein the replication program is configured to perform one or more data transformations or schema transformations in replicating data of a source database to a target database, wherein replicated data at the target database is different from the data of the source database;
performing an integration test on the code and the update of the replication program, before the replication program is used in an actual replication process, wherein the performing comprises:
selecting a source table from the source database, the source table including data to be copied to a new location;
determining an expected table corresponding to the source table for the integration test, the expected table including data from the source table as it would appear at the new location as a result of a successful replication process, including the one or more data transformations or schema transformations, in executing the replication program comprising the code and the update;
executing the code of the replication program including the update against the data of the source table;
generating a runtime table as a result of the executing, the runtime table including data of the source table as it would be replicated to the new location using the code of the replication program including the update, wherein the runtime table includes data from the source table including the one or more data transformations or schema transformations;
determining an expected hash of the expected table;
generating a runtime hash of the runtime table;
determining a result of the integration test and whether the replication process using the code of the replication program including the update was successful based on a comparison of the runtime hash to the expected hash; and
providing a report for display on a computing device including the determination as to whether the replication process using the code of the replication program including the update was successful, wherein upon determining a successful result of the integration test as indicated by the report, the replication program including the update is made available for the actual replication process.

9. The system of claim 8, wherein the generating the runtime hash of the runtime table comprises:
generating a plurality of hash values for the runtime table, wherein each of the plurality of hash values for the runtime table corresponds to a different row of the runtime table.

10. The system of claim 9, wherein the determining the expected hash of the expected table comprises:
determining that each of a plurality of hash values for the expected table corresponds to a different row of the expected table.

11. The system of claim 10, wherein the comparison comprises:
comparing at least a subset of the plurality of hash values for the runtime table to corresponding hash values for corresponding rows of the expected table.

12. The system of claim 11, wherein the comparing comprises:
determining that a first hash value for the runtime table does not match a corresponding second hash value for the expected table;
identifying a row corresponding to the first hash value; and
providing the identified row in the report for display on the computing device.

13. The system of claim 12, the operations further comprising:
identifying a first set of values corresponding to the identified row of the runtime table;
identifying a second set of values corresponding to the identified row of the expected table; and
providing the first set of values and the second set of values in the report for display on the computing device.

14. The system of claim 8, wherein the source table is selected and the expected table is determined prior to the identifying that code of the replication program includes an update.

15. A non-transitory computer-readable medium having instructions stored thereon that, when executed by at least one computing device, cause the at least one computing device to perform operations comprising:

identifying that code of a replication program includes an update, wherein the replication program is configured to perform one or more data transformations or schema transformations in replicating data of a source database to a target database, wherein replicated data at the target database is different from the data of the source database;

performing an integration test on the code and the update of the replication program, before the replication program is used in an actual replication process, wherein the performing comprises:

selecting a source table from the source database, the source table including data to be copied to a new location;

determining an expected table corresponding to the source table for the integration test, the expected table including data from the source table as it would appear at the new location as a result of a successful replication process, including the one or more data transformations or schema transformations, in executing the replication program comprising the code and the update;

executing the code of the replication program including the update against the data of the source table;

generating a runtime table as a result of the executing, the runtime table including data of the source table as it would be replicated to the new location using the code of the replication program including the update, wherein the runtime table includes data from the source table including the one or more data transformations or schema transformations;

determining an expected hash of the expected table;

generating a runtime hash of the runtime table;

determining a result of the integration test and whether the replication process using the code of the replication program including the update was successful based on a comparison of the runtime hash to the expected hash; and providing a report for display, the report including the determination as to whether the replication process using the code of the replication program including the update was successful, wherein upon determining a successful result of the integration test as indicated by the report, the replication program including the update is made available for the actual replication process.

16. The non-transitory computer-readable medium of claim 15, wherein the generating the runtime hash of the runtime table comprises:

generating a plurality of hash values for the runtime table, wherein each of the plurality of hash values for the runtime table corresponds to a different row of the runtime table.

17. The non-transitory computer-readable medium of claim 16, wherein the determining the expected hash of the expected table comprises:

determining that each of a plurality of hash values for the expected table corresponds to a different row of the expected table.

18. The non-transitory computer-readable medium of claim 17, wherein the comparison comprises:

comparing at least a subset of the plurality of hash values for the runtime table to corresponding hash values for corresponding rows of the expected table.

19. The method of claim 1, wherein the providing the report comprises:

providing, for display, a user option to making the update live and available for testing, wherein upon receiving a selection of the user option, the replication program including the update is made available for the actual replication process.

20. The method of claim 1, wherein the generating comprises:

replacing one or more NULL values in the source table with a known value.

* * * * *